United States Patent
Malang et al.

(10) Patent No.: US 6,975,123 B1
(45) Date of Patent: Dec. 13, 2005

(54) METHOD AND APPARATUS FOR CALIBRATING PIEZOELECTRIC DRIVER IN DUAL ACTUATOR DISK DRIVE

(75) Inventors: Keith Malang, Longmont, CO (US); Larry Hutsell, Loveland, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/028,068

(22) Filed: Dec. 20, 2001

Related U.S. Application Data
(60) Provisional application No. 60/257,005, filed on Dec. 20, 2000.

(51) Int. Cl.[7] .......................... G11B 21/24; G01R 33/12
(52) U.S. Cl. ...................... 324/658; 324/727; 360/292; 702/85
(58) Field of Search ................................ 324/212, 727, 324/658; 360/77.16, 291.9, 292, 294.4, 294.5

(56) References Cited

U.S. PATENT DOCUMENTS 4,514,773 A  *  4/1985 Susz ........................ 360/77.01

* cited by examiner

Primary Examiner—N. Le
Assistant Examiner—Donald M. Lair
(74) Attorney, Agent, or Firm—Tejpal S. Hansra

(57) ABSTRACT

A method and apparatus are disclosed which are operable to determine a capacitance associated with at least one piezoelectric element in an dual actuator disk drive. The capacitance information is used to adjust a driver used to drive the piezoelectric element. Capacitance is determined by supplying a predetermined current into the piezoelectric element(s) for a predetermined time period. A voltage associated with the piezoelectric element(s) is measured following the predetermined time period. The capacitance of the piezoelectric element(s) is then calculated based on the measured voltage, the current supplied, and the predetermined time period.

9 Claims, 4 Drawing Sheets

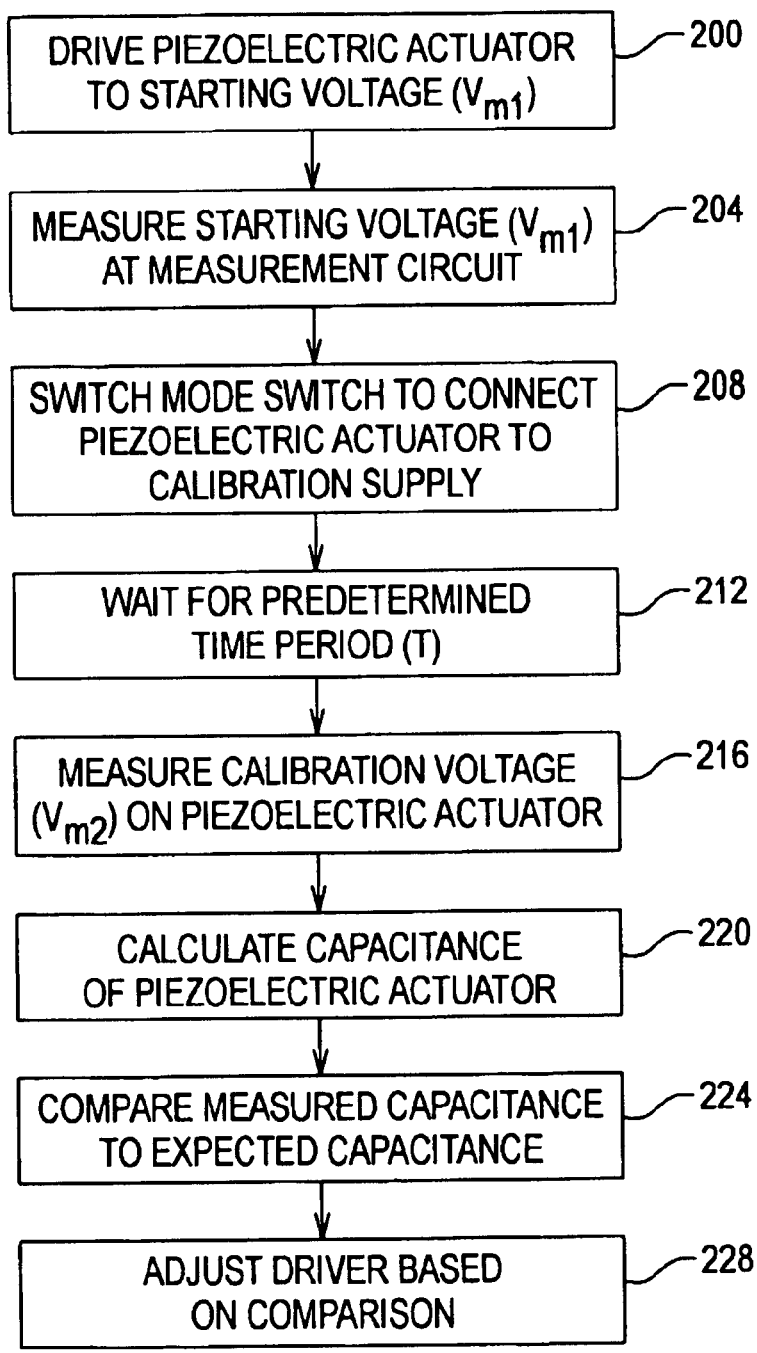

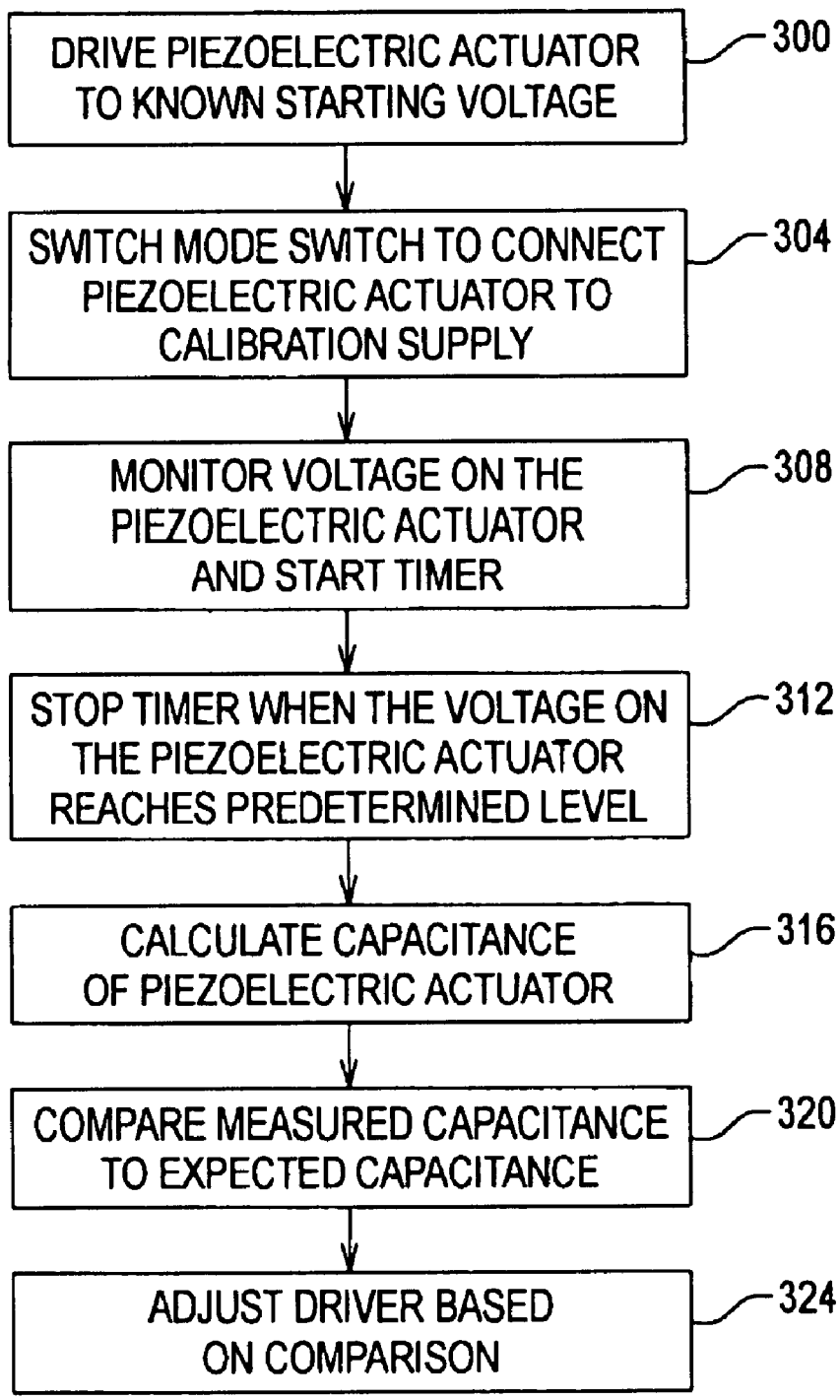

METHOD AND APPARATUS FOR CALIBRATING PIEZOELECTRIC DRIVER IN DUAL ACTUATOR DISK DRIVE

Priority is claimed from U.S. Provisional Patent Application No. 60/257,005, filed Dec. 20, 2000 entitled "Piezo Driver With Constant Current Calibration Mode," which is incorporated by reference in its entirety.

FIELD OF THE INVENTION

The invention relates generally to digital data storage systems and, more particularly, calibration of piezoelectric drivers in dual actuator hard disk drives.

BACKGROUND OF THE INVENTION

A hard disk drive typically includes one or more magnetic disks rotatably mounted in association with a spindle and one or more actuators for positioning a transducer or head relative to data tracks on the surface of each disk. The actuator typically comprises a pivotable base plate, a load beam or suspension arm affixed to the base plate, a flexure at the distal end of the load beam and a slider and transducer or a head assembly affixed to the flexure. A voice coil motor induces movement of the actuator to position the head relative to the disk surface. Typically, the voice coil motor and servo system provide both gross positioning of the head, i.e., track to track positioning, and fine positioning, i.e., track following. Recently, piezoelectric elements have been incorporated into actuators to provide fine positioning of the head assembly for track following purposes, rather than only relying upon the voice coil motor for fine positioning.

With the emphasis on making hard drives smaller for numerous applications including portable computers, magnetic disks are not only becoming smaller, but data tracks are becoming increasingly more densely positioned on the disks and the tracks themselves are becoming physically narrower. As a result, maintaining the transducer or head in an accurate track following position for purposes of reading and writing is becoming more complex. To accommodate increasingly finer adjustments in the position of the magnetic head, dual positionable actuators have been introduced. In a first mode, a voice coil motor will move the actuator from track to track. In a second mode, the voice coil motor will provide fine positioning of the distal end and head assembly, together with a fine actuation element positioned on the actuator. Piezoelectric elements are commonly used as fine actuation elements. By supplying a current to a piezoelectric element, the piezoelectric element can expand and contract in a controlled manner to adjust the distal end of the actuator arm and thereby accurately maintain position of the head relative to the disk surface.

With reference to FIG. 1, an example of the end portion of a dual actuator 10 is illustrated. As can be seen, the forward end of the dual actuator 10 comprises a suspension load beam 12 which includes a secured end portion 14 attached to an actuator arm 15 and a suspended end portion 16 opposite the secured end portion. More particularly, a swage plate 18 with a cylindrical portion or bushing 20 is positioned in a complementary hole in the distal end of an actuator arm 15 and the adjacent metal surfaces are swaged or joined together. A pair of arm segments 22, 24 extend between the main body of the secured end portion 14 of the suspension load beam 12 and the forward portion 16. At the forward end 16, the suspension load beam 12 supports a flexure member 26, which in turn supports a slider, including a magnetic head that reads digital information from and writes digital information to the disk (not shown).

A piezoelectric element 32 comprising two piezoelectric crystals 34, 36 having generally the same physical configuration and properties, are affixed to the arm segments 22, 24. The piezoelectric crystals 34, 36 are commonly positioned on the arm segments 22, 24 with opposed polarizations. A wire 38 electrically connects each of the piezoelectric crystals 34, 36 to a driver on the printed circuit board of the hard drive (not shown). While two piezoelectric crystals are illustrated, the piezoelectric element 32 may also have a single piezoelectric crystal affixed to one of the arm segments 22, 24. Likewise, more than two piezoelectric crystals may be affixed to the arm segments 22, 24.

The driver is generally either a voltage control driver, or a charge control driver. The piezoelectric crystals 34, 36 can be modeled as a capacitor ($C_{piezo}$). A voltage control driver controls the voltage ($V_{piezo}$) across each piezoelectric crystal 34, 36, and a charge control driver controls the amount of charge ($Q_{piezo}$) driven into and out of each piezoelectric crystal 34, 36. The two control parameters are related by the equation ($Q_{piezo} = C_{piezo} * V_{piezo}$).

A charge control driver can be advantageous because the charge gain of a piezoelectric crystal (i.e., the output position versus input charge) is relatively consistent over temperature and part variation, compared to the voltage gain (i.e., the output position vs. input voltage) of a voltage control driver. Unfortunately, a charge control driver has several disadvantages. One such disadvantage is that a charge control driver requires relatively complex circuitry in order to be able to drive a specific amount of charge into and out of the piezoelectric device, as compared to the circuitry required for a voltage control driver. This relatively complex circuitry is also expensive to design and manufacture, as compared to a voltage control driver. Accordingly, it would be advantageous to have a piezoelectric gain which is consistent over temperature and part variation, and also a driver that is relatively simple and inexpensive to design and manufacture.

Another disadvantage of a charge control driver is that the dynamic range of the output driver is dependent on the number of piezoelectric elements being driven. The driven charge is distributed between the elements (i.e., two elements need twice as much charge to cause the same displacement as a single element). This sensitivity to the number of elements included in the drive requires the ability to select a discrete dynamic range setting within the charge control driver to match the number of piezoelectric elements. Thus, if a disk drive has a number of actuator arms, a driver needs to be set to have a dynamic range to accommodate all of the piezoelectric elements present in the drive.

As will be understood, numerous configurations exist for the number of disks, and thus actuator arms, present in disk drives. In order to help reduce costs, it is advantageous to use as many common parts as possible for all disk drive configurations. Also, as will be understood by those of skill in the art, disk drive operations are generally controlled using firmware present within the disk drive. It is also advantageous to use common firmware for different disk drive configurations, in order to simplify manufacturing and reduce development costs associated with developing firmware. Accordingly, it would be advantageous to have a driver which is able to drive a variable number of piezoelectric elements, depending upon the particular requirement for a disk drive. For example, a driver may be needed for a disk drive with a single disk, and thus a single actuator arm. A driver may also be needed for a disk drive with four disks, and thus four actuator arms. Using a common driver, and thus common circuit board for the different disk drives would be advantageous for the purposes of making the manufacturing process less complex by having fewer differences in component parts between the two disk drives. Furthermore, common component parts would also allow for a common inventory between the disk drives, as well as a reduction in development costs which would be required to design the different components. Accordingly, it would be advantageous to have a common driver and common firmware which are able to drive a variable number of piezoelectric elements, depending upon the configuration of disk drive in which the driver is used.

The voltage control driver can solve many of the above-mentioned disadvantages associated with a charge control driver. First, a voltage control driver is a less complex driver implementation than a charge control driver, and therefore less expensive. The voltage control driver is also not dependent upon the number of piezoelectric elements being driven, and is thus more suitable for use as a common component which may be used in disk drives having different numbers of piezoelectric elements. The firmware used to control a voltage control driver thus may also be common for disk drives having different numbers of piezoelectric elements. However, the voltage control driver also has several disadvantages.

One disadvantage of the voltage control driver is that the voltage gain (i.e., output position versus voltage) is more sensitive to temperature and part variation than a charge control driver. Temperature variation within the disk drive, and thus within the piezoelectric element(s), can result in a variation in the apparent capacitance. This variation can result in positioning errors in the transducer is they are not properly compensated. In addition to temperature variation, the variation in parts can also result in a variation in the apparent capacitance. As an important consideration in the manufacture of hard disk drives is the cost of component parts, it is often advantageous to have component parts which have a relatively large tolerance. If a relatively small tolerance is required for a component part, the unit cost of that component is generally more than the unit cost of a component having a relatively large tolerance. Therefore, it would be advantageous to have a relatively inexpensive driver which is able to compensate for variation in the piezoelectric elements.

Additionally, when designing a driver for a piezoelectric element, a proper voltage gain is needed for a voltage control driver, and a proper dynamic range setting is needed for a charge control driver. As mentioned above, it would be advantageous to use common components. Furthermore, as different applications may be better suited for a charge control or voltage control driver, it would also be advantageous to be able to have a circuit which is able to compensate for either a charge control driver, or a voltage control driver.

Accordingly, it would be advantageous to have a dual actuator disk drive which (1) is relatively inexpensive; (2) is able to support a variable number of piezoelectric elements without firmware or driver modifications; (3) is able to accurately compensate for variations (e.g., temperature variations) which may be present in the piezoelectric element(s); and (4) has a calibration circuit which is able to compensate for both charge and voltage control drivers.

SUMMARY OF THE INVENTION

The present invention solves the aforementioned problems and meets the aforementioned, and other, needs.

In one embodiment, the invention provides a calibration circuit operable to determine a capacitance associated with at least one piezoelectric element in an dual actuator disk drive. The capacitance information is used to adjust a driver used to drive the piezoelectric element.

In one embodiment, capacitance is determined by supplying a predetermined current into the at least one piezoelectric element for a predetermined time period. A voltage associated with the at least one piezoelectric element is measured following the predetermined time period. The capacitance of the at least one piezoelectric element is then calculated based on the measured voltage, the current supplied, and the predetermined time period.

The capacitance measurement may be conducted following the manufacture of the disk drive. In this manner, after a disk drive is in operation, variation in the capacitance of the at least one piezoelectric element may be compensated to enhance the positioning of a transducer associated with the dual actuator disk drive.

Additional features and other embodiments of the present invention will become apparent from the following discussion, particularly when taken together with the accompanying drawings.

BRIEF DESCRIPTION OF THE DRAWINGS

FIG. 5 is a flow chart illustrating the operational steps for calibrating a driver for one embodiment of the present invention; and FIG. 6 is a flow chart illustrating the operational steps for calibrating a driver for another embodiment of the present invention.

DETAILED DESCRIPTION

Figure 1:
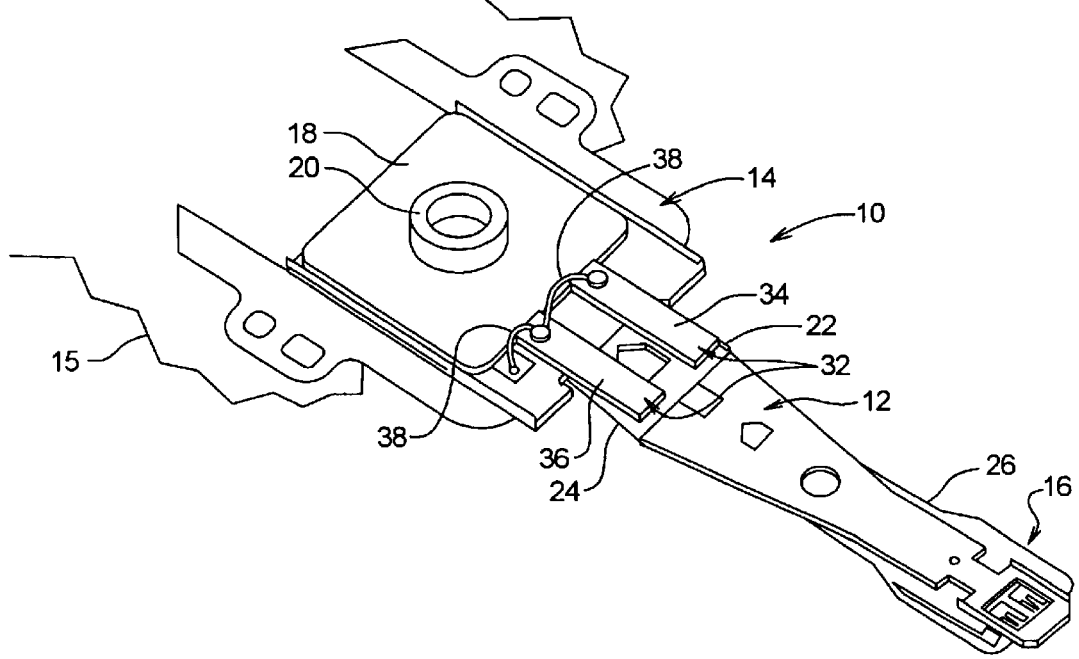
FIG. 1 is a diagrammatic representation of a top perspective view of a portion of a dual actuator.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 2:
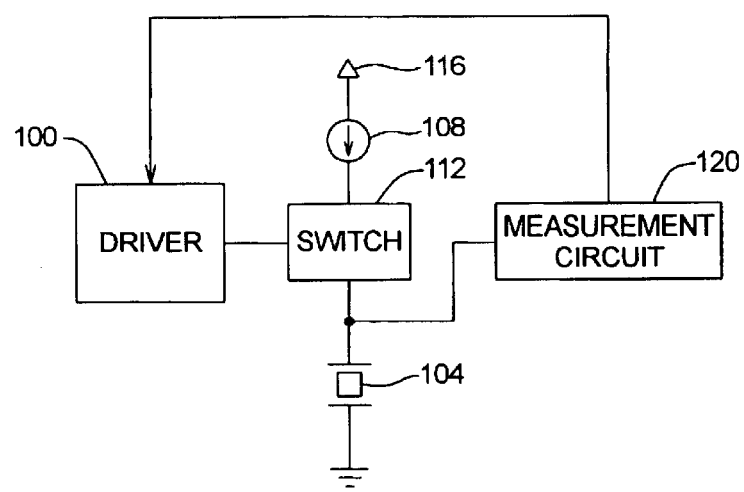
FIG. 2 is a block diagram illustration of a driver and calibration circuit of one embodiment of the present invention.

Referring to FIG. 2, a block diagram illustration of a driver, calibration, and measurement circuit for a dual actuator disk drive is now described. The circuit includes a driver 100 which drives a piezoelectric actuator 104. The circuit also includes a calibration supply 108, and a mode switch 112, which switches the piezoelectric actuator 104 between the driver 100 and the calibration supply 108.

The calibration supply 108 is connected to a voltage source 116, and is operable to supply a constant current ($I_{cal}$) into the piezoelectric actuator 104, which is used to calibrate the piezoelectric actuator 104. The calibration procedure used to calibrate the piezoelectric actuator 104 will be discussed in more detail below.

Also connected to the piezoelectric actuator 104 is a measurement circuit 120 which monitors the voltage on the piezoelectric actuator 104. The measurement circuit 120 provides feedback to the driver 100, which is used in controlling the movement of the piezoelectric actuator 104. The mode switch 112 normally connects the piezoelectric actuator 104 to the driver 100, and switches to connect the piezoelectric actuator 104 to the calibration supply 108 during calibration of the actuator.

Figure 3:
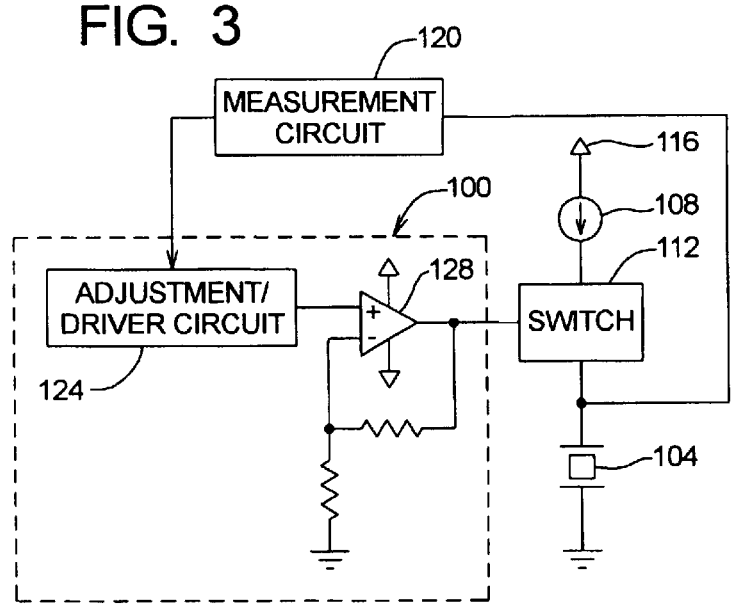
FIG. 3 is a block diagram illustrating the driver and calibration circuit of FIG. 2 showing additional details of the driver for one embodiment of the present invention.

Referring now to FIG. 3, a more detailed illustration of the driver 100 is now described. The driver 100, in this embodiment, includes an adjustment/driver circuit 124 and an amplifier 128. The adjustment/driver circuit 124 receives the measurement information from the measurement circuit 120, and adjusts the output sent to the amplifier 128 based on the output of the measurement circuit 120. In this embodiment, firmware is used to determine the proper adjustment for the driver circuit. In one embodiment, the adjustment/driver circuit 124 includes a charge control driver, and the adjustment is made based on the required dynamic range required to drive the piezoelectric actuator 104 based on the measurement information received from the measurement circuit 120. In another embodiment, the adjustment/driver circuit 124 includes a voltage control driver and the adjustment is made based on the difference between the value received from the measurement circuit and an expected value. The procedure for determining the required adjustment will be discussed in more detail below.

Figure 4:
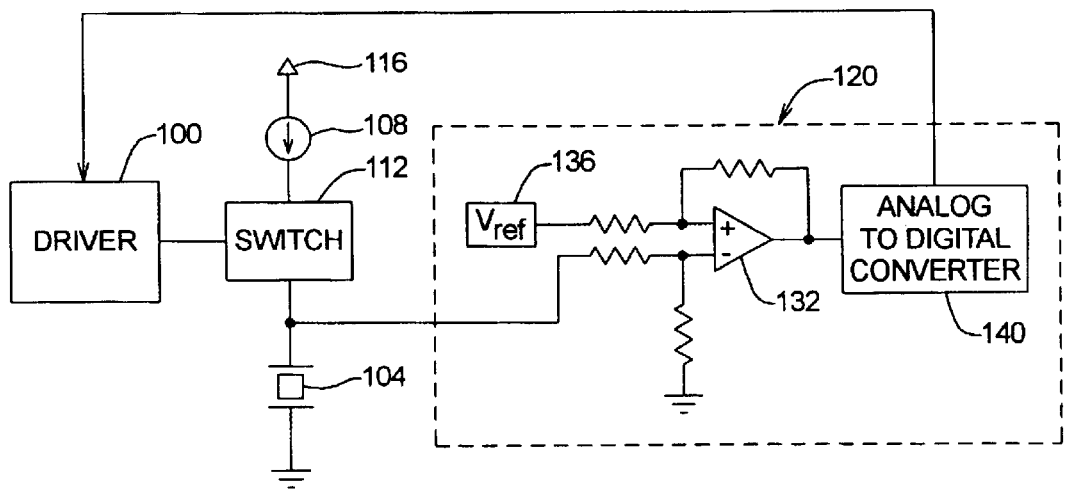
FIG. 4 is a block diagram illustrating the driver and calibration circuit of FIG. 2 showing additional details of the measurement circuit for one embodiment of the present invention.

Referring now to FIG. 4, a more detailed illustration of the measurement circuit 120 is now described. In this embodiment, the measurement circuit includes a comparator amplifier 132, which outputs a signal which is proportional to the difference between a reference voltage (Vref) and the voltage present on the piezoelectric actuator 104. This value is received at an analog to digital converter 140, and is converted to a digital value. This digital value is used by the driver 100 as feedback information for adjusting the driver 100.

Referring now to the flow chart illustration of FIG. 5, the operational steps for calibrating the piezoelectric actuator 104 are now discussed. Initially, the output voltage of the piezoelectric actuator 104 is driven to a known starting voltage (i.e., zero volts) using the driver 100, as noted by block 200. The measurement circuit 120 measures the starting voltage ($V_{m1}$) at block 204. In one embodiment, this measurement is taken from the measurement circuit 120 with an analog to digital converter converting the voltage level received at the measurement circuit 120 into a digital value. The digital value of the first voltage ($V_{m1}$) is stored in memory by the firmware used to control the driver 100. At block 208, the mode switch 112 is switched to connect the piezoelectric actuator 104 to the calibration supply 108. When the mode switch 112 connects the piezoelectric actuator 104 to the calibration supply 108, the current ($I_{cal}$) from the calibration supply 108 flows into the piezoelectric actuator 104. As noted by block 212, the current from the calibration supply 108 is allowed to flow into the piezoelectric actuator 104 for a predetermined time period (T). After delaying for the predetermined time period (T), the measurement circuit 120 measures a calibration voltage ($V_{m2}$) of the piezoelectric device 104, as noted by block 216. The calibration voltage ($V_{m2}$) is dependent upon the amount of charge that is introduced into the piezoelectric actuator 104, and the physical properties of the piezoelectric actuator 104. In one embodiment, the calibration voltage is measured by the analog to digital converter 104, and the associated digital value is stored in memory. Following the measurement of the calibration voltage ($V_{m2}$), as noted by block 220, the firmware calculates the capacitance of the piezoelectric actuator 104. This calculation is performed, in one embodiment, according to the formula $C_{piezo}=I_{cal}*T/(V_{m2}-V_{m1})$. At block 224, the measured capacitance ($C_{piezo}$) is compared to an expected capacitance, and this difference value is stored in firmware. The driver 100 is then adjusted based on the comparison between the measured and expected capacitance, as noted by block 228.

The difference between the expected capacitance and the measured capacitance can be used for several purposes. For example, if the measurement is the first taken for a particular disk drive, this can give the disk drive information regarding the number of piezoelectric elements present in the disk drive. The firmware is then able to select a proper dynamic range setting for a charge control driver. As mentioned above, it is useful to use common parts when manufacturing disk drives. Using the above described calibration allows for a common driver circuit to be used for disk drives having a varying number of dual actuators. When performing the calibration upon powering up, the disk drive automatically determines the total capacitance of the piezoelectric elements present. The power supply can be designed such that the firmware can select an appropriate dynamic range, if a charge control driver is present in the power supply. As mentioned above, the dynamic range for the charge control driver depends upon the number of piezoelectric elements present in the disk drive.

In one embodiment, the dynamic range is selected based on dividing the measured capacitance ($C_{piezo}$) by an expected capacitance of a single piezoelectric element. As the piezoelectric elements are driven in parallel, the total capacitance of the piezoelectric elements can be determined by adding the capacitance of the individual elements. Thus, by dividing the measured capacitance ($C_{piezo}$) by an expected capacitance of a single piezoelectric element the total number of elements can be ascertained, and the proper dynamic range of the charge control driver selected. Because the number of elements will be a discrete number, the result of the division operation may be rounded to the nearest natural number, and the dynamic range selected based on the natural number.

If a disk drive is using a voltage control driver, as described above, variance in the circuit may arise due to part and temperature variations. By using a constant current calibration as described above, the part and temperature variance can be compensated for relatively accurately. Furthermore, the capacitance of a piezoelectric element may drift over the lifetime of the element. A disk drive may perform periodic calibrations to determine the difference between the expected capacitance and the measured capacitance in order to accurately compensate for any such variation. The voltage gain for the power supply can then be adjusted to compensate for any difference in capacitance. In one embodiment, the disk drive performs a calibration upon powering up, and determines the measured capacitance for use in adjusting the voltage gain. The disk drive then periodically performs calibrations in order to compensate for temperature drift or any other variation which may occur while the disk drive is operating.

Referring now to the flow chart illustration of FIG. 6, an alternative embodiment for determining the calculated capacitance is now described. Initially, as noted by block 300, the driver 100 is used to drive the piezoelectric actuator 104 to a known starting voltage ($V_{m1}$). The mode switch 112 is then switched to connect the piezoelectric actuator 104 to the calibration supply 108 to supply the calibration current ($I_{cal}$) to the piezoelectric actuator 104, as noted by block 304. The measurement circuit 120 monitors the voltage present on the piezoelectric actuator 104, and starts a timer, as noted by block 308. The measurement circuit 120 continues to monitor the voltage on the piezoelectric actuator 104 until the voltage reaches a predetermined level ($V_{m2}$), as which point the measurement circuit 120 stops the timer and stores the elapsed time (T), as noted by block 312. The capacitance of the piezoelectric actuator 104 is then calculated to determine the measured capacitance, as noted by block 316.

In this embodiment, the capacitance is calculated according to the formula $C_{piezo}=I_{cal}*T/(V_{m2}-V_{m1})$. However, because the voltages $V_{m2}$ and $V_{m1}$ are known, the only variable is the elapsed time (T). As is understood by those skilled in the art, multiplication is a simpler function to carry out using a processing circuit, thus this embodiment can help reduce processing overhead associated with calculating the measured capacitance by multiplying the elapsed time (T) by a predetermined constant number. The constant number would correspond to the calibration current divided by the voltage difference ($I_{cal}/(V_{m2}-V_{m1})$). Next, at block 320, the measured capacitance is compared to an expected capacitance, and the value is stored. The driver 100 is then adjusted based on the comparison in a similar manner as described above, as noted by block 324.

While an effort has been made to describe some alternatives to the preferred embodiment, other alternatives will readily come to mind to those skilled in the art. For example, such a compensation scheme may also be useful for other types of dual actuator disk drives, such as a microactuator disk drive, or a nanoactuator disk drive. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method for calibrating a driver in a dual actuator disk drive, comprising:

determining a measured capacitance associated with at least one piezoelectric element prior to positioning the piezoelectric element over a disk surface including the steps of:

driving said at least one piezoelectric element to a predetermined starting voltage:

supplying a predetermined current to said at least one piezoelectric element for a predetermined time period;

measuring a second voltage associated with said at least one piezoelectric element after said supplying step; and calculating said measured capacitance based on said measuring step, wherein said calculating step is performed based on the following equation:

$$C=I*(T/(V_{m2}-V_{m1})$$

where C is the measured capacitance, I is the current supplied to said at least one piezoelectric element during said supplying step, T is the predetermined time period; $V_{m2}$ is the second voltage, and $V_{m1}$ is the starting voltage; and adjusting said driver based on said determining step.

2. A method, as claimed in claim 1, further comprising:

secondly determining a second measured capacitance associated with said at least one piezoelectric element after a predetermined time period following said adjusting step; and secondly adjusting said driver based on said determining step.

3. A method, as claimed in claim 1, wherein said adjusting step includes:

determining a difference between said measured capacitance and an expected capacitance; and adjusting a gain associated with said driver based on said determining step.

4. A method, as claimed in claim 1, wherein said driver is a voltage control driver.

5. A method, as claimed in claim 1, wherein said driver is a charge control driver.

6. A method for calibrating a driver in a dual actuator disk drive, comprising:

determining a measured capacitance associated with at least one piezoelectric element prior to positioning the piezoelectric element over a disk surface including the steps of:

driving said at least one piezoelectric element is a predetermined starting voltage;

supplying a predetermined current to said actuator element;

starting a timer;

monitoring a voltage associated with said at least one piezoelectric element;

stopping said timer to get an elapsed time when said voltage reaches a predetermined voltage level in said monitoring step; and calculating said measured capacitance based on said elapsed time, wherein said calculating step is performed based on the following equation:

$$C=I*(T/(V_{m2}-V_{m1})$$

where C is the measured capacitance, I is the current supplied to said at least one piezoelectric element during said supply step, T is the elapsed time, $V_{m2}$ is the predetermined voltage level, and $V_{m1}$ is the starting voltage; and adjusting said driver based on said determining step.

7. A method for determining a number of piezoelectric elements present in a dual actuator hard disk drive, comprising:

determining a total capacitance associated with at least one piezoelectric element including the steps of:

driving said at least one piezoelectric element is a predetermined starting voltage;

supplying a predetermined current to said at least one piezoelectric element for a predetermined time period;

measuring a second voltage associated with said at least one piezoelectric element after said supplying step; and calculating said total capacitance based on said measuring step, wherein said calculating step is performed based on the following equation:

$$C=I*(T/(V_{m2}-V_{m1})$$

where C is the total capacitance, I is the current supplied to said at least one piezoelectric element during said supplying step, T is the predetermined time period; $V_{m2}$ is the second voltage, and $V_{m1}$ is the starting voltage;

ascertaining a number of piezoelectric elements present in said disk drive based on said determining step.

8. A method for determining a number of piezoelectric elements present in a dual actuator hard disk drive, comprising:

determining a total capacitance associated with at least one piezoelectric element ascertaining a number of piezoelectric elements present in said disk drive based on said determining step, wherein said ascertaining step comprises:

dividing said total capacitance by an expected capacitance and rounding to the closest natural number.

9. A method, as claimed in claim 8, wherein said expected capacitance is approximately a capacitance associated with a single piezoelectric element.

* * * * *